INVENTORS
CHARLES Z. MONROE
HARRY B. EGLESTON by: Wolfe, Hubbard, Voit & Osann
ATTYS.

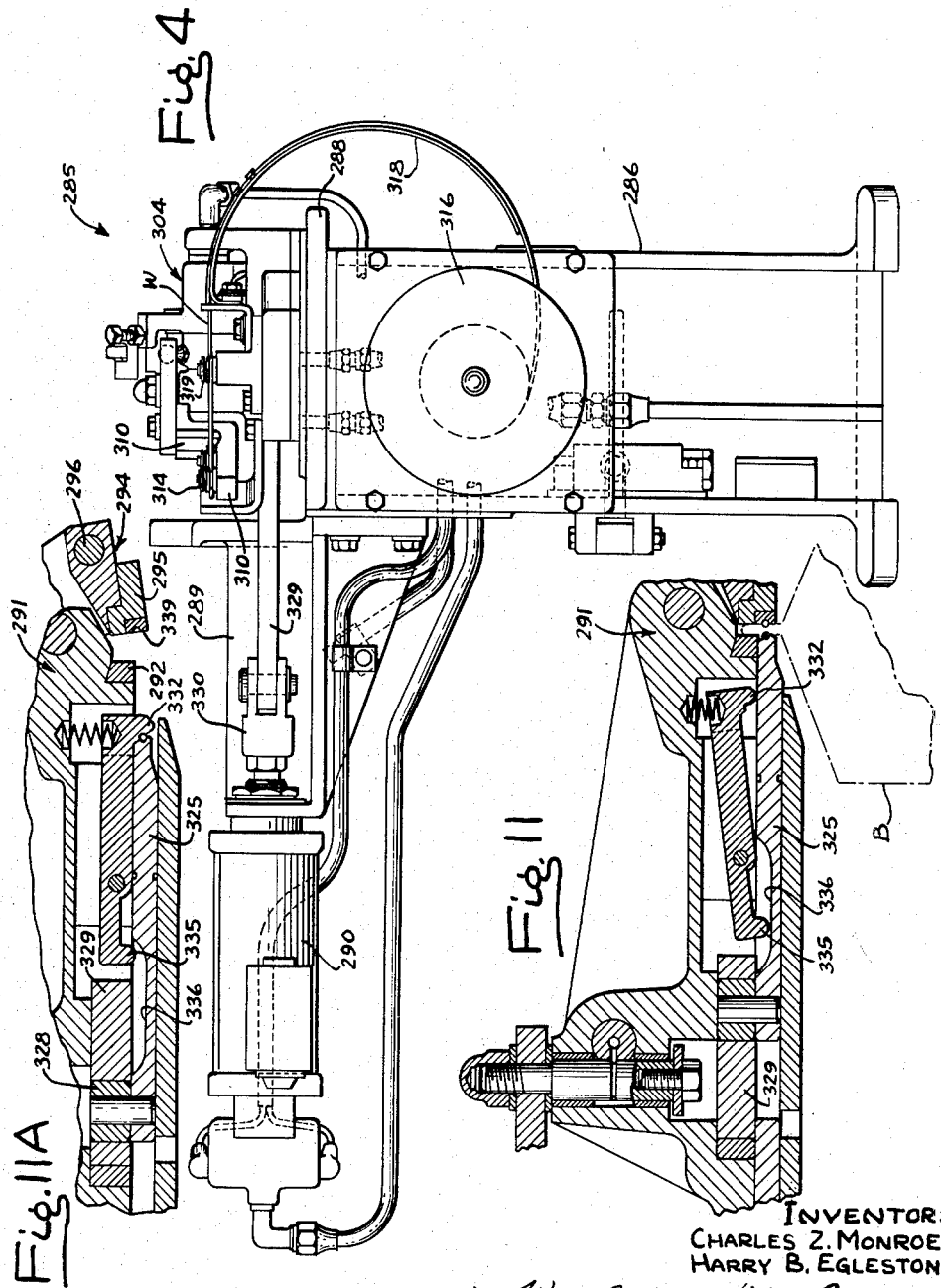

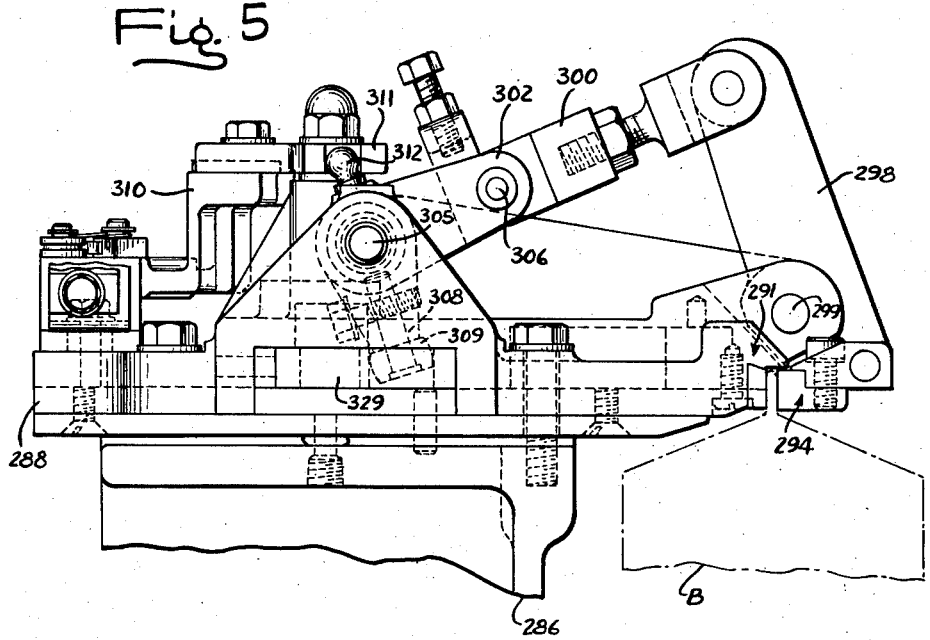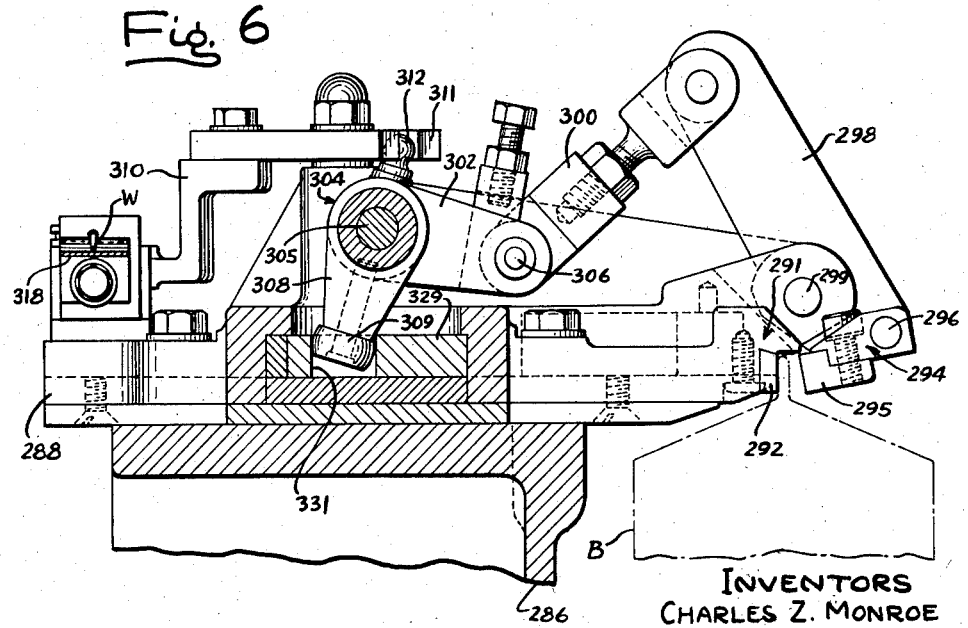

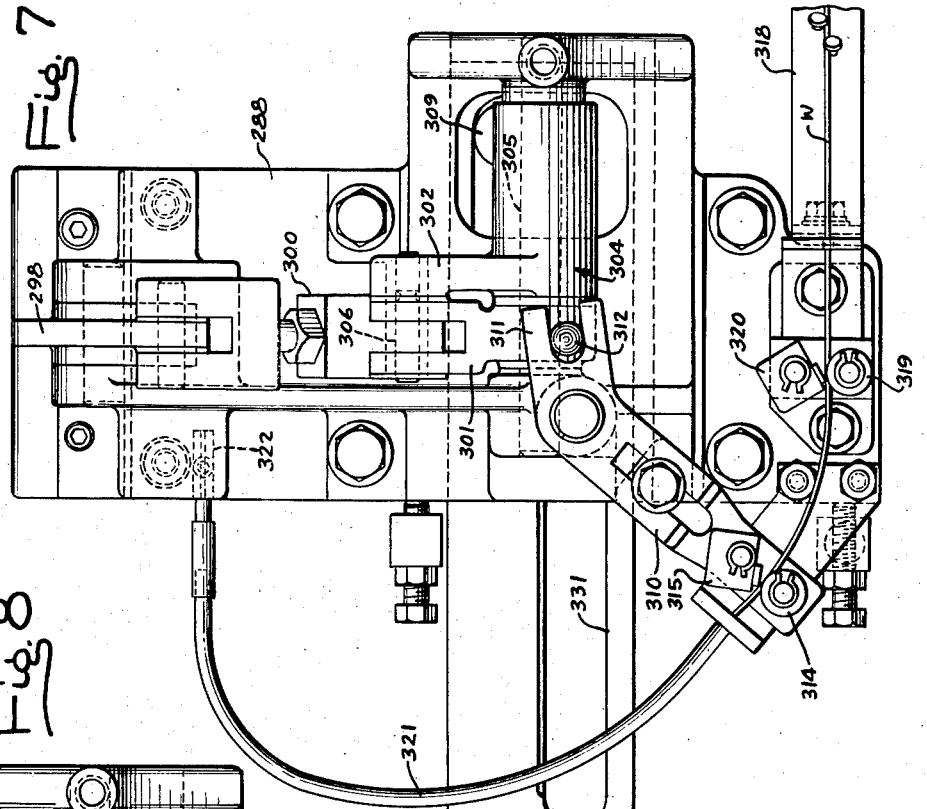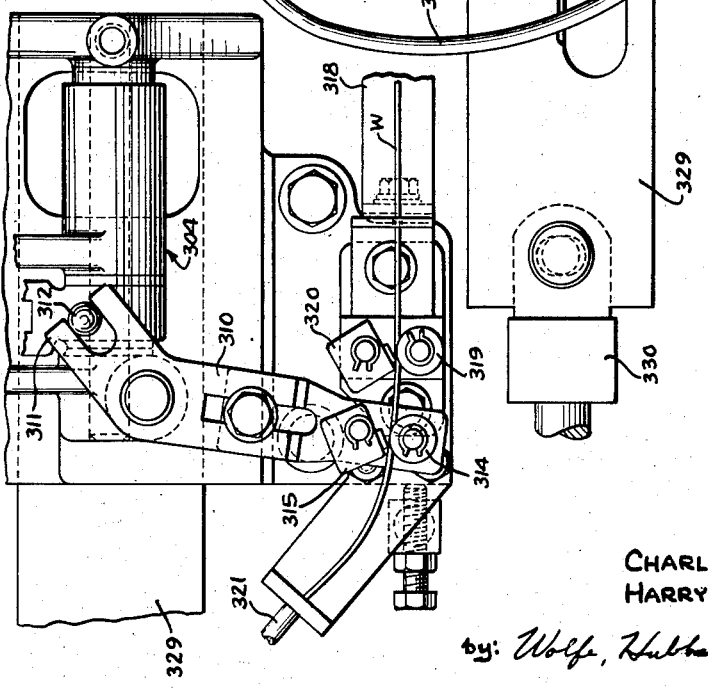

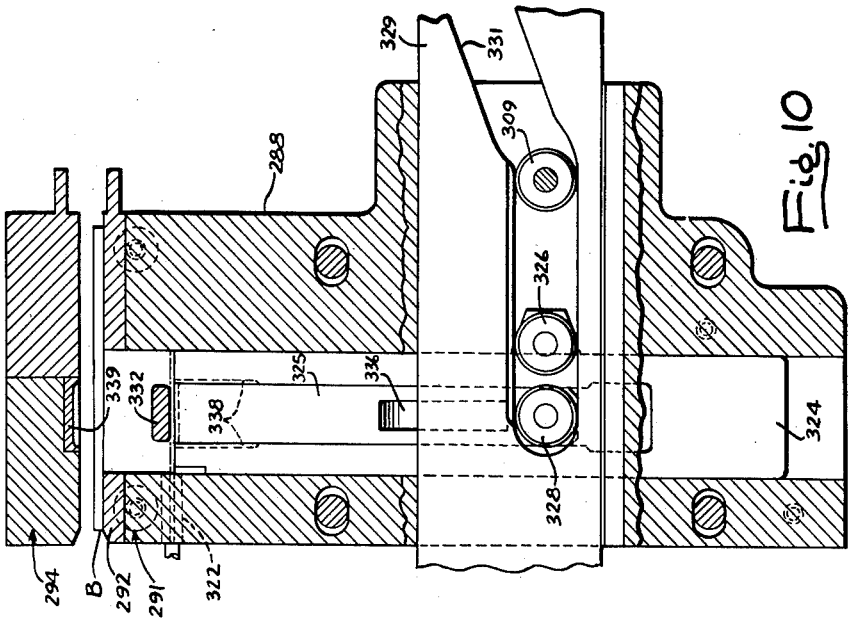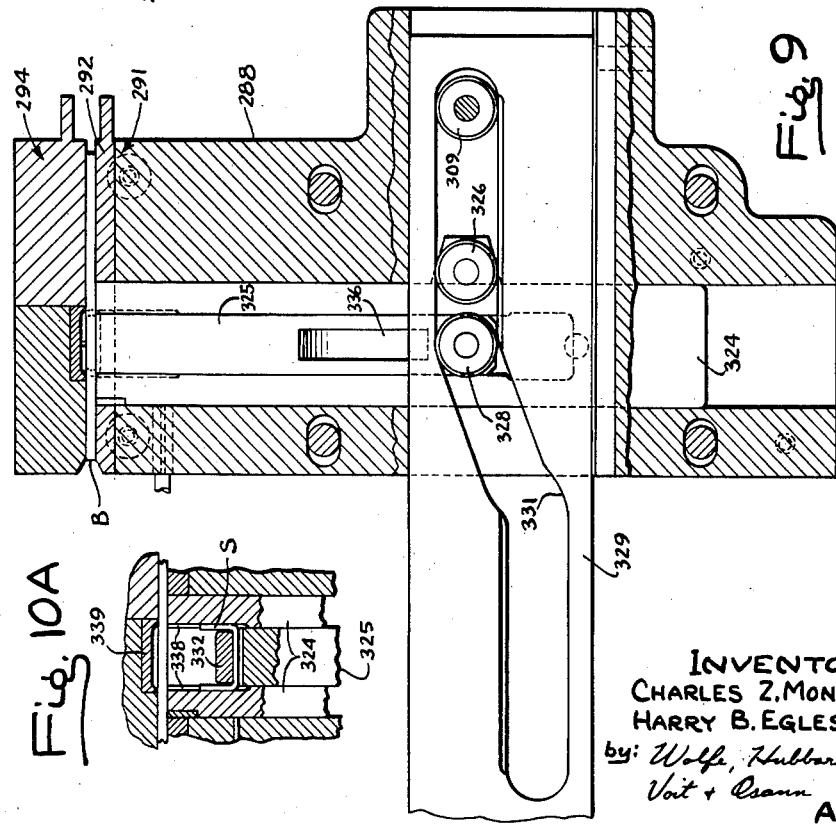

United States Patent Office 2,975,570
Patented Mar. 21, 1961

2,975,570

SEALING AND STAPLING MECHANISM FOR CONTAINER FABRICATING MACHINE

Charles Z. Monroe, Detroit, and Harry B. Egleston, Livonia, Mich., assignors, by mesne assignments, to Ex-Cell-O Corporation, Detroit, Mich., a corporation of Michigan Original application July 16, 1957, Ser. No. 672,200. Divided and this application Apr. 9, 1959, Ser. No. 805,287

5 Claims. (Cl. 53—138)

The present invention relates in general to carton forming machinery of the type disclosed in United States Patent Nos. 2,357,535 and 2,367,884, issued September 5, 1944, and January 23, 1945, respectively, on the application of Charles Z. Monroe. More specifically, the invention is concerned with an improved sealing and stapling mechanism adapted to be embodied in a machine for forming, coating, filling, closing and sealing gable top containers of paperboard or the like. The machine finds particular, but not exclusive, utility in producing, from flat collapsed blanks, finished and filled cartons of the type shown in United States Patent No. 2,750,095, issued June 12, 1956, on the application of Carroll R. Alden.

This application is a division of our copending application Serial No. 672,200, filed July 16, 1957, now Patent No. 2,957,289, dated October 25, 1960, and entitled Machine for Fabricating Containers.

One object of the invention is to provide an improved sealing and stapling mechanism for a carton forming machine of the character set forth and which will be of simple, rugged construction and particularly reliable in operation.

Another object is to provide a sealing and stapling mechanism for a machine of the foregoing type and adapted to produce cartons with top closures which are more effectively sealed than in prior machines of this nature.

Other and further objects will become apparent as the following description proceeds, taken together with the accompanying drawings, wherein:

Fig. 4 is a side elevation of the sealing and stapling mechanism of the machine, together with its supporting column.

Figs. 5 and 6 are enlarged fragmentary elevational views showing the jaws of the sealing and stapling mechanism, certain parts in Fig. 5 being shown in vertical section.

Figs. 7 and 8 are enlarged fragmentary plan views of that portion of the mechanism shown in Figs. 5 and 6.

Figs. 9, 10 and 10A are enlarged fragmentary plan views showing internal parts of the sealing and stapling mechanism in different operative positions.

Figs. 11 and 11A are enlarged fragmentary vertical sectional views detailing internal parts of the sealing and stapling mechanism in different operative positions.

Figure 1:
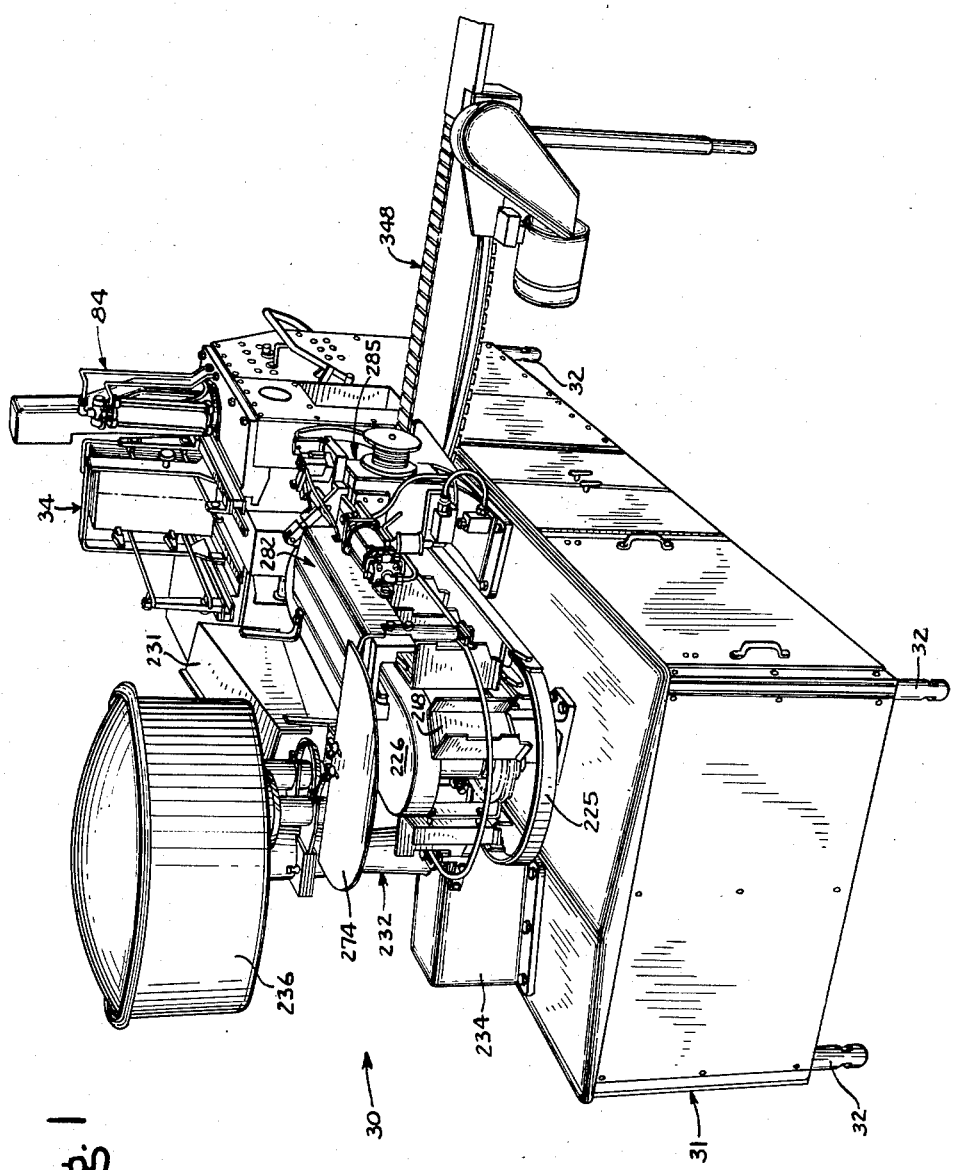
Figures 1 and 2 are perspective views showing opposite sides of an illustrative machine embodying a sealing and stapling mechanism exemplifying the present invention.

While the invention is susceptible of various modifications and alternative constructions, a certain illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

Figure 2:
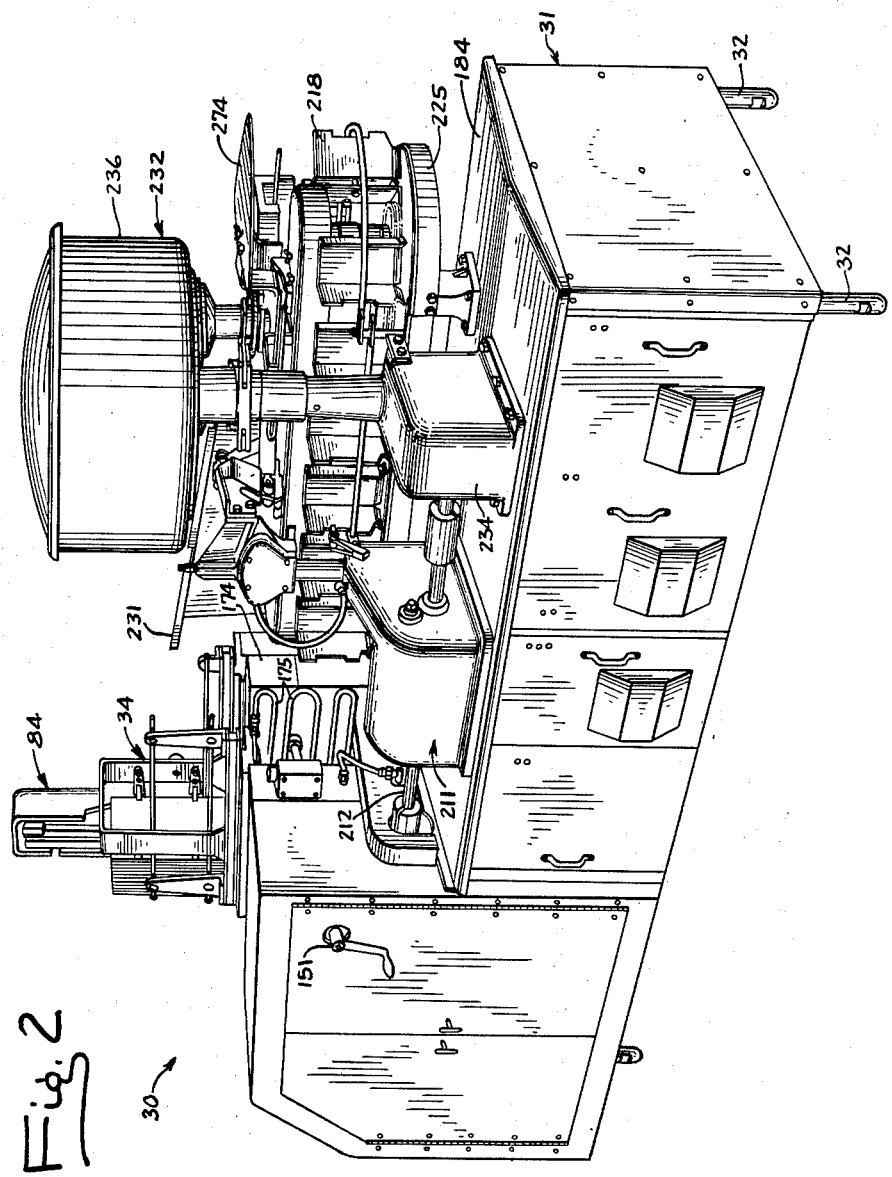
Figure 3:
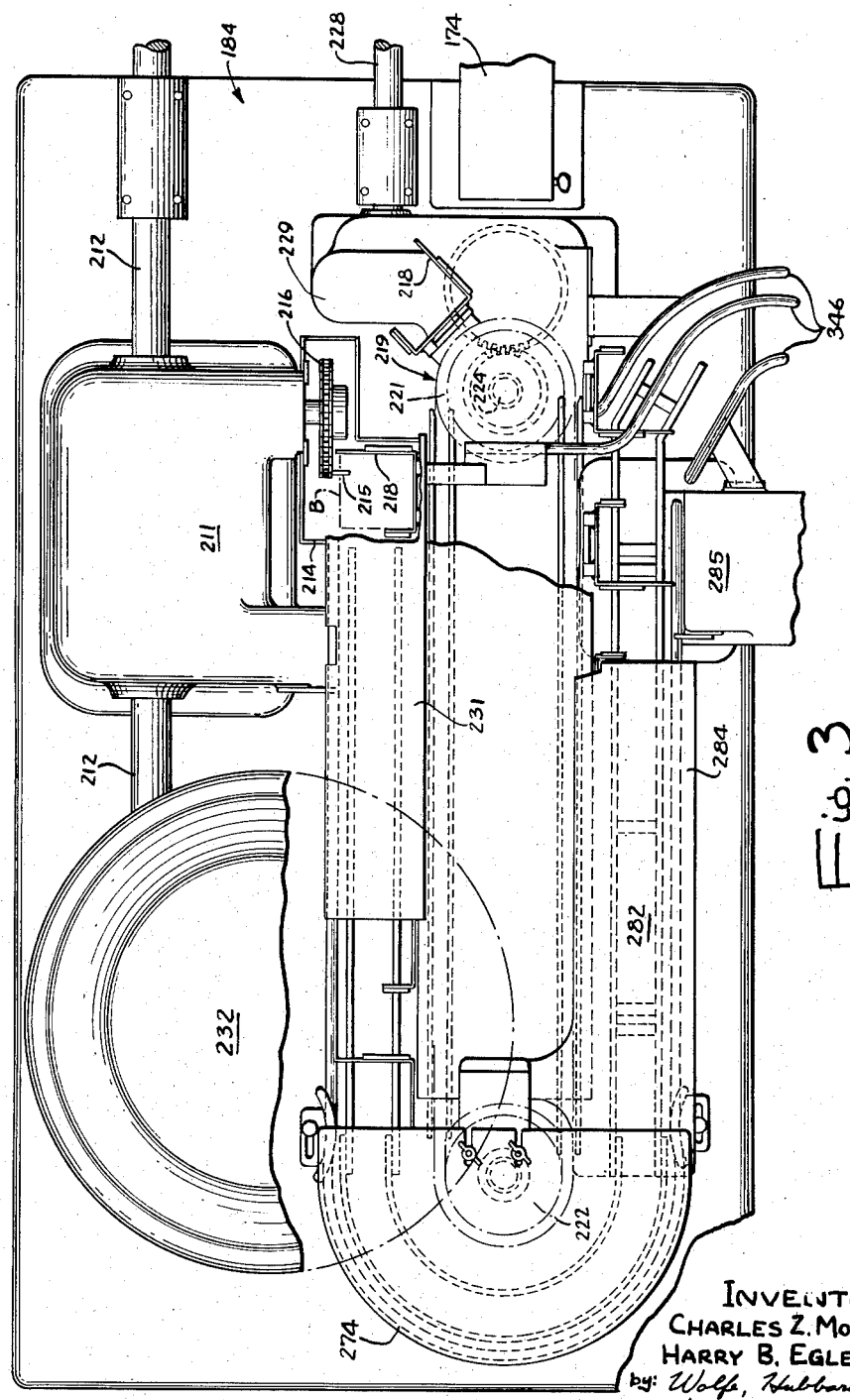
Fig. 3 is a fragmentary plan view of the machine and the sealing and stapling mechanism of Fig. 1.

Referring more specifically to Figs. 1 and 2, the invention is there shown exemplified in a novel machine 30 for fabricating containers of paperboard or the like and having a sealing and stapling mechanism embodying the present invention. The machine is adapted to receive a supply of flat tubular blanks which are appropriately cut and scored, and to operate on them in such a manner that a procession of filled and sealed containers is discharged therefrom. In the course of such operation, each flat tubular blank is withdrawn from a stack or magazine by means of a feeding mechanism, is erected into a tubular form and passed through a bottom forming mechanism, a moistureproof coating mechanism, and a cooling mechanism, the container then being filled, closed, sealed, and discharged from the machine.

The machine 30 is particularly well adapted to produce paper containers such as the familiar gable top paper milk container disclosed in Alden U.S. Patent No. 2,750,095, supra. This container comprises a single sheet of paper or paperboard cut and scored so as to be divided into a plurality of panels and areas which are utilized for the walls of the container and the closure parts when the container is erected. The blank, as presented to the machine, is folded upon itself and has its side seam already glued, thus defining a collapsed, open-ended tube. When erected and subsequently processed in the machine 30, the resulting container is self-sustaining in shape, strong, sanitary, and low in cost.

The illustrative machine 30 is constructed upon a console 31 supported a slight distance above the floor as by means of legs 32. The console is subdivided into a number of compartments each readily accessible from the exterior of the machine by means of access apertures or suitable doors.

The interior of the console 31 houses mechanisms for moving, erecting, bottom-forming, coating and cooling the containers fabricated by the machine 30. The exterior of the console, on the other hand, supports mechanisms for moving, partially closing or breaking, filling, closing, sealing and stapling the containers after they emerge from the interior. These latter mechanisms are situated primarily on top of the console 31.

Referring more specifically to Figs. 1 and 2, it might be noted that the machine 30 has a magazine 34 situated on top of the console and adapted to hold a stack of flat, collapsed container blanks B. The blanks B are withdrawn one by one from the magazine and each erected in an open-ended, squared tube by means of a feeder unit. The latter presents each blank to a loader unit 84 which, in turn, transfers it to a mandrel assembly situated inside the console of the machine. The latter and various related mechanisms glue and close the bottom flaps of the blank, coat it with moistureproofing material, such as paraffin, and discharges it as an open topped container into a large cooling compartment situated inside the machine console beneath an impervious roof panel 184. The cooled container is then transferred from the cooling compartment by means of an elevator and breaker mechanism 211 driven from continuous drive shaft 212 of the machine. The container B, still open at the top, is thereupon presented to a waiting carrier 218 forming one of a series of carriers on an upper conveyor 219 which moves the container under the splash guard 231 and past the various mechanisms on top of the console for the filling, closing, sealing and stapling operations.

All the foregoing mechanisms are grouped in the machine 30 in a highly compact manner, thereby minimizing the size of the machine. Such compactness is achieved, moreover, while maintaining a relatively rapid flow of containers through the machine and permitting ready access for cleaning and maintenance. By reason of this, and also in view of the fact that the feeding and discharging stations of the machine are placed in relatively close proximity, it is readily possible for a single operator to run the machine.

The sealing and stapling mechanism 285 (Figs. 4 to 11A, inclusive) is situated outboard of the upper conveyor 219 and adjacent the discharge end of the closer mechanism 282. The mechanism 285 is adapted to seal and staple the top closure rib of each container at a single station in the travel of the container. The staple is, in effect, driven through a sealed top rib resulting in a tighter structure than that produced where stapling and sealing are separate operations.

The sealing and stapling mechanism 285 comprises a hollow boxlike column 286 (Fig. 4) rigidly fixed in upstanding relation on the impervious top wall 184 of the cooling compartment. The column 286 conveniently houses a number of air and electric service lines which are required for operation of the mechanism 285. At the top of the column 286 there is mounted a bedplate 288 which supports most of the moving parts of the mechanism. A laterally extending bracket 289 also fixed to the upper portion of the column 286 extends longitudinally of the machine and supports a fluid actuator, in this instance, an air cylinder 290, at its outer end for imparting movement to the mechanism 285.

The bedplate 288 projects inwardly toward the conveyor 219 and has a squared end which is adapted to abut against the top rib of the container when the latter is in the sealing and stapling station. This end of the bedplate serves as a fixed jaw 291 and for that purpose may be provided with a hardened insert 292. Operatively associated with the fixed jaw 291 is a movable jaw 294 (Figs. 5, 6, 10, 10A) which has a hardened insert 295 and, in addition, an electric heater element 296. The movable jaw 294 is provided with an integrally attached jaw arm 298 pivotally mounted on the bedplate by means of pin 299. The upper end of the jaw arm 298 is pivotally connected to an adjustable link 300 which, in turn, is pivotally attached to arms 301, 302 of bell crank 304. The bell crank 304 is journaled upon a fixed shaft 305 and is so constructed that its arms 301, 302 normally move in unison, being joined together by means of shear pin 306.

The bell crank 304, including the arms 301, 302, is adapted to be oscillated upon the shaft 305 for actuation of the movable jaw 294. For this purpose, the bell crank 304 is provided with an integral depending arm 308 (Figs. 5, 6). At its lower end, the arm 308 has a roller 309 journaled thereon, the roller having a convex peripheral surface.

Pivotally mounted on the bedplate 288 for oscillatory movement in a general horizontal plane is a lever 310 (Figs. 5, 6, 7, 8) which is actuated by means of a yoke 311 and a ball-shaped pin 312 fixed to the bell crank 304. The lever 310 has vertically offset end portions and carries adjacent its free end a guide roller 314 and a wire gripper 315. Upon being subjected to a given increment of angular movement by the bell crank 304, the lever 310 is adapted to feed a predetermined length of wire into the sealing and stapling mechanism 285 in timed relation to the movement of its other component parts. The wire W is drawn from a suitable spool 316 (Figs. 1 and 4) journaled on the column 286. The wire W is led along a resilient, semi-circular guide 318 which provides sufficient slack to prevent wire breakage in event of a sudden jerk. The wire W is then passed through a fixed guide roller 319 and gripper block 320 which prevent retrograde movement, through the guide roller 314 and gripper block 315 of the lever 310, and then into a tubular guide 321 leading into the bedplate 288. The latter preferably has a hardened sleeve 322 for receiving the wire W and holding the same during cut-off or shearing.

Slidably mounted within the bedplate 288 and disposed in perpendicular relation to the jaws 291, 294, are a cut-off and bender element 324 and a staple driver 325 (Figs. 9, 10, 10A). Both of these elements are movable relative to the bedplate 288 and relative to each other. They are adapted to be brought into abutting relation with the top rib of the container via a suitable aperture in the fixed jaw 291. Sliding movement may be imparted to the cut-off and bender element 324 by means of a roller 326 and to the driver 325 by means of another roller 328.

For the purpose of actuating the movable parts in properly timed relation with each other, the mechanism 285 is provided with a cam bar 329 slidably mounted in a suitable guideway which happens to be substantially parallel with the faces of the jaws 291 and 294. The cam bar is operated by means of the air cylinder 290 through an appropriate connecting yoke 330 (Fig. 4). The bar 329 is formed with a cam path 331 which confines and guidingly moves the rollers 309, 326 and 328 and their associated parts.

Operatively associated with the cut-off and bender 324 and with the driver 325 is a former block 332 (Figs. 10, 10A) about which the wire W is bent as a staple is being formed. The former block 332 is carried on a resiliently biased, pivotally mounted arm 334 (Figs. 11, 11A) and is positively cammed into lowered position by means of a follower finger 335 which cooperates with a groove 336 in the driver. The former block 332 is cammed into raised position directly by the driving end of the driver 325.

The operation of the sealing and stapling mechanism 285 will become more apparent upon further reference to Figs. 4 to 11A, inclusive. Starting with the cam bar 329 in its right-hand position, as viewed in Fig. 10, it will be noted that all three rollers 309, 326 and 328 are in their remote positions with respect to the jaws 291 and 294. Under these conditions, the movable jaw 294 is open and the mechanism is ready to receive the top rib of a container B.

As it moves into its station in underlying relation with the mechanism 285, the container actuates a switch which initiates the operating cycle of the mechanism. The air cylinder 290 thereupon causes the cam bar 329 to commence moving to the left, as viewed in Fig. 10. The cam path 331 also moves to the left and causes the jaw actuating roller 309 to move toward the jaws. This ultimately shifts the roller 309 to its closest position with respect to the jaws and actuates the bell crank 304 to effect clamping of the movable jaw 294 against the top rib of the container and the fixed jaw 291. At the same time, the bell crank 304 oscillates the lever 310 in a clockwise direction as viewed in Fig. 7. This feeds a length of wire into the stapler mechanism via the harden sleeve or die block 322. At the same time, the former block 332 is in its lower position adjacent the newly fed length of wire.

Further leftward movement of the cam bar 329 next shifts the roller 326 towards the jaws, resulting in a corresponding movement of the cut-off and bender in that direction. This action cuts the wire to appropriate length for a staple and bends the wire around the former block 332, the wire entering alinement grooves 338 in the walls of the cut-off and bender element. At this point, the staple S has been formed and is held in position with the ends of the staple legs pointing toward the top rib of the container (Fig. 10A).

Further leftward movement of the cam bar 329 results in shifting the roller 328 toward the jaws, causing the driver 325 to move rapidly in that direction. Such movement of the driver cams the former block 332 out of the way and forces the staple legs through the top rib of the container, at the same time bending their projecting ends against clincher block 339 in the face of the movable jaw 294.

The completed and filled container then emerges in finished form from the sealing and stapling mechanism 285 and is led by discharging guide rails 346 to an appropriate discharge conveyor 348.

We claim as our invention:

1. In a machine for fabricating containers and having means for filling and closing the same, a sealing and stapling mechanism comprising, in combination, a bedplate having one end defining a fixed jaw, a movable jaw mounted on said bedplate and disposed for cooperation with said fixed jaw, a bender and cut-off element, a staple driver, a wire feed element, and a common means including a cam bar slidably mounted on said bedplate and directly connected with said movable jaw, bender and cut-off element, staple driver and wire feed element for actuating the same in timed sequence with each other.

2. In a machine for fabricating containers and having means for filling and closing the same, a sealing and stapling mechanism comprising, in combination, a bedplate having one end defining a fixed jaw, a movable jaw pivoted on said bedplate for cooperation with said fixed jaw, a bender and cut-off element, a staple driver, a wire feed element, a cam bar slidably mounted on said bedplate, follower means disposed for movement by said cam bar and connected with said movable jaw, with said bender and cut-off element, with said staple driver and with said wire feed element, and means for shifting said cam bar and thereby actuating in sequentially timed relation said follower means and their respective associated parts.

3. In a machine for fabricating containers and having means for filling and closing the same, a sealing and stapling mechanism comprising, in combination, a bedplate having one end defining a fixed jaw, a movable jaw pivoted on said bedplate for cooperation with said fixed jaw, a generally U-shaped bender and cut-off element having laterally spaced legs and being slidably mounted on said bedplate in substantially perpendicular relation to said jaws, a staple driver element slidably mounted between said legs of said bender and cut-off element, a movable forming block disposed for cooperation with said driver, a wire feed lever, a cam bar slidably mounted on said bedplate and having a cam path thereon, a first follower disposed in engagement with said cam path and connected with said movable jaw and with said wire feed lever, second and third followers connected respectively with said bender and cut-off element and with said staple driver, and means for shifting said cam bar relative to said bedplate and said followers to actuate said mechanism.

4. In a machine for fabricating containers and having means for filling and closing the same, a sealing and stapling mechanism comprising, in combination, a bedplate having one end defining a fixed jaw, a movable jaw pivoted on said bedplate for cooperation with said fixed jaw, a bender and cut-off element, a staple driver, a former block disposed for coaction with said bender and cut-off element, means interposed between said driver and said former block for positively shifting the same into and out of operative position, a wire feed element, a cam bar slidably mounted on said bedplate, follower means disposed for movement by said cam bar and connected with said movable jaw, with said bender and cut-off element, with said staple driver and with said wire feed element, and means for shifting said cam bar and thereby actuating in sequentially timed relation said follower means and their respective associated parts.

5. In a machine for fabricating containers and having means for filling and closing the same, a sealing and stapling mechanism comprising, in combination, a bedplate having one end defining a fixed jaw, a movable jaw mounted on said bedplate and disposed for cooperation with said fixed jaw, a bender and cut-off element, a staple driver, a former block fixed to a resiliently loaded pivotally mounted arm, cam means interposed between said pivotally mounted arm and said staple driver for positively shifting said former block into and out of operative position, a wire feed element, and a common means including a cam bar reciprocably mounted on said bedplate and directly connected with said movable jaw, bender and cut-off element, staple driver and wire feed element for actuating the same in timed sequence with each other.

References Cited in the file of this patent
UNITED STATES PATENTS

| | | |
|---|---|---|
| 2,030,067 | Litchfield | Feb. 11, 1936 |
| 2,063,345 | Scott | Dec. 8, 1936 |
| 2,750,721 | Earp et al. | June 19, 1956 |
| 2,755,471 | Wittkuhns et al. | July 24, 1956 |